US012526610B2

United States Patent
Renard et al.

(10) Patent No.: US 12,526,610 B2
(45) Date of Patent: *Jan. 13, 2026

(54) MESSAGE TRANSMISSION IN A MULTI-TERMINAL CONTEXT

(71) Applicant: ORANGE, Issy-les-Moulineaux (FR)

(72) Inventors: Vladimir Renard, Chatillon (FR); Christophe Suart, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 993 days.

This patent is subject to a terminal disclaimer.

(21) Appl. No.: 17/601,228

(22) PCT Filed: Apr. 1, 2020

(86) PCT No.: PCT/EP2020/059200
§ 371 (c)(1),
(2) Date: Oct. 4, 2021

(87) PCT Pub. No.: WO2020/201321
PCT Pub. Date: Oct. 8, 2020

(65) Prior Publication Data
US 2022/0191654 A1    Jun. 16, 2022

(30) Foreign Application Priority Data
Apr. 5, 2019 (FR) .................................... 1903653

(51) Int. Cl.
*H04W 4/00* (2018.01)
*H04L 45/74* (2022.01)
(Continued)

(52) U.S. Cl.
CPC ............. *H04W 4/14* (2013.01); *H04L 45/742* (2013.01); *H04L 51/58* (2022.05)

(58) Field of Classification Search
CPC ......... H04W 4/14; H04L 45/742; H04L 51/58
See application file for complete search history.

(56) References Cited

U.S. PATENT DOCUMENTS 8,331,963 B1 * 12/2012 Lin .................. H04L 51/56
455/435.1

FOREIGN PATENT DOCUMENTS

EP    613102 A1    8/1994
EP    1613102 A1   1/2006
(Continued)

OTHER PUBLICATIONS

Universal Mobile Telecommunications System (UMTS); LTE; 3GPP Generic User Profile (GUP); Architecture (Stage 2) (3GPP TS 23.240 version 15.0.0 Release 15), vol. 3GPP SA, No. V15.0.0, Jun. 29, 2018 (Jun. 29, 2018), p. 1-36, ETSI Technical Specification, European Telecommunications Standards Institute (ETSI), 650, Route Des Lucioles; F-06921 Sophia-Antipolis, France; Retrieved from the Internet: URL:http://www.etsi.org/deliver/etsi_ts/123200_123299/123240/15.00.00_60/ts_123240v150000p.pdf, XP014329533.

(Continued)

*Primary Examiner* — Omoniyi Obayanju
(74) *Attorney, Agent, or Firm* — David D. Brush; Westman, Champlin & Koehler, P.A.

(57) ABSTRACT

A method, a synchronization server, a corresponding terminal, and a system for transmitting a message intended for a first terminal, referred to as a destination terminal, from a second terminal, referred to as a source terminal, to at least one third terminal, referred to as an associated terminal, sharing a same identifier with the source terminal. The method includes transmitting from the source terminal to a synchronization server a first synchronization message, in which the message intended for the destination terminal is inserted, and recovering by using the at least one associated terminal the message intended for the destination terminal from the synchronization server by using at least a second synchronization message.

12 Claims, 3 Drawing Sheets

(51) Int. Cl.
  *H04L 51/58* (2022.01)
  *H04W 4/14* (2009.01)

(56) References Cited

FOREIGN PATENT DOCUMENTS

FR     2865092 A1    7/2005
FR     3053560 A1    1/2018

OTHER PUBLICATIONS

"Digital cellular telecommunications system (Phase 2+) (GSM); Universal Mobile Telecommunications System (UMTS); Technical realization of the Short Message Service (SMS) (3GPP TS 23.040 version 15.2.0 Release 15)", vol. 3GPP CT, No. V15.2.0, Sep. 27, 2018 (Sep. 27, 2018), p. 1-219, ETSI Technical Spec. EP Telecomm. Standards Institute (ETSI), 650, Route Des Lucioles ; F-06921 Sophia-Antipolis, France; Retrieved from the Internet: URL:http://www.etsi.org/deliver/etsi_ts/123000_123099/123040/15.02.00_60/ts_123040v150200p.pdf, XP014329467.

English translation of the Written Opinion of the International Searching Authority dated May 8, 2020 for corresponding International Application No. PCT/EP2020/059200, filed Apr. 1, 2020.

Notice of Allowance and Fee(s) Due for U.S. Appl. No. 17/601,301, mailed Jul. 12, 2024, 5 pages.

International Search Report dated Apr. 30, 2020 for corresponding International Application No. PCT/EP2020/059199, Apr. 1, 2020.

Written Opinion of the International Searching Authority dated Apr. 30, 2020 for corresponding International Application No. PCT/EP2020/059199, filed Apr. 1, 2020.

English translation of the Written Opinion of the International Searching Authority dated May 8, 2020 for corresponding International Application No. PCT/EP2020/059199, filed Apr. 1, 2020.

Non-Final Rejection for U.S. Appl. No. 17/601,301, mailed Mar. 20, 2024, 12 pages.

International Search Report dated Apr. 30, 2021 for International Application No. PCT/EP2020/059200, filed Apr. 1, 2020.

Written Opinion of the International Searching Authority dated Apr. 30, 2021 for International Application No. PCT/EP2020/059200, filed Apr. 1, 2020.

* cited by examiner

MESSAGE TRANSMISSION IN A MULTI-TERMINAL CONTEXT

CROSS-REFERENCE TO RELATED APPLICATIONS

This Application is a Section 371 National Stage Application of International Application No. PCT/EP2020/059200, filed Apr. 1, 2020, the content of which is incorporated herein by reference in its entirety, and published as WO 2020/201321 on Oct. 8, 2020, not in English.

FIELD OF THE DISCLOSURE

The present invention relates to the transmission of messages in a multi-terminal context, and in particular to the sending of SMS messages in such a context.

BACKGROUND OF THE DISCLOSURE

The SMS (for "Short Message Service") messaging system was developed years ago in order to allow the sending of short text messages between mobile terminals, by way of signaling messages used in second-generation mobile communication networks of the day. This system was standardized through the 3GPP TS 23.240 and TS 23.040 standards and experienced immense success, to the point that it is still widely used today.

However, the SMS messaging system as standardized was originally designed for cases of message transmission from a single transmitter mobile terminal to a single recipient mobile terminal.

However, what are known as "multi-terminal" systems, in which a set of terminals share one and the same identifier that is common to the terminals of one and the same system, have been developed recently. This common identifier may be the telephone number natively linked to one of the terminals of the system. This common identifier may also be a number not natively linked to one of the terminals of the system, such a number then being able to be called an "extra number", or even "virtual number", which is typically a new number assigned by the operator and not linked to a SIM card or to a particular terminal. This common identifier may be used by a user, with any one of the terminals of the system, to make or receive a telephone call using any one of these terminals by way of this identifier.

The SMS messaging system described above turns out not to be completely compatible with this type of "multi-terminal" system. In particular, in the case of SMS messages sent using an identifier able to be used by a set of associated mobile terminals within a multi-terminal system, if the SMS system as currently standardized is applied, each mobile terminal of the multi-terminal system behaves completely independently of the other terminals of this system, without taking into account the existence of the other mobile terminals that are still associated with the common identifier within the multi-terminal system.

Patent application EP 1 613 102 A1 describes a system for controlling the delivery of short messages, in which it is possible, by way of instructions stored in a database of a network entity, to flexibly program the redirection, copying or distribution of short messages transmitted by a source terminal and received by this network entity.

However, the distribution of short messages to a plurality of recipient terminals, as envisaged in this system, is based on the use of separate MSISDN identifiers for each recipient terminal, in order to be able to address the short message to be distributed to each of these recipient terminals using a conventional messaging network architecture. Such a system therefore proves to be incompatible with the sending of messages to a "multi-terminal" system as described above, since the terminals of such a "multi-terminal" system share one and the same common identifier, while the control system in this patent application EP 1 613 102 A1 requires separate identifiers for each terminal to which a short message is to be distributed.

Patent application FR 3 053 560 A1 for its part describes a message redirection system resulting from the modification of a conventional SMS messaging system, in which a database is added in order to redirect a message intended for a first telephone line to a separate second telephone line and, if this redirection fails, to then redirect this message to the first telephone line.

However, the principle of this system is based on the redirection of a message to a single terminal at a time, and therefore does not in any way envision the above-described problem linked to the transmission of messages to the terminals of a "multi-terminal" system. Furthermore, in this case too, with each terminal necessarily being identified by a separate telephone line in the system in this patent application, this system proves to be incompatible with the sending of messages to a "multi-terminal" system in which multiple terminals share one and the same common identifier.

SUMMARY

The present invention therefore aims to overcome these drawbacks.

To this end, what is proposed is a method for transmitting a message intended for a first terminal, called recipient terminal, from a second terminal, called source terminal, to at least one third terminal, called associated terminal, sharing one and the same identifier with the source terminal, comprising the steps of transmission, from the source terminal to a synchronization server, of a first synchronization message into which the message intended for the recipient terminal is inserted, and of said at least one associated terminal retrieving the message intended for the recipient terminal from the synchronization server by way of at least one second synchronization message.

According to one embodiment, this method furthermore comprises transmission, from the source terminal to a routing gateway, of the message intended for the recipient terminal, so that said routing gateway is able to retransmit said message to the recipient terminal in the signaling plane.

According to another embodiment of the invention, which may be combined with the previous one, this method furthermore comprises transmission, from the synchronization server to a network node responsible for storing and retransmitting messages, of the message intended for the recipient terminal, so that said network node is able to retransmit said message to the recipient terminal.

According to one advantageous aspect of this other embodiment, the method furthermore comprises a step of the synchronization server determining the transmission of the message from the source terminal to a routing gateway, the transmission of the message from the synchronization server to the network node taking place only if the result of this determination is positive. This determination step may in particular be performed by way of detecting an activation indicator for the transmission of the message from the source terminal to a routing gateway, inserted into the first synchronization message.

According to another aspect of the invention, the method furthermore comprises the synchronization server storing the message intended for the recipient terminal, extracted from the first synchronization message, so as to allow said at least one associated terminal to retrieve the message intended for the recipient terminal.

In one particular embodiment, the message intended for the recipient terminal is a message in the SMS format.

In one particular embodiment, the first and/or the second synchronization message is a message conforming to a protocol from among the IMAP, JMAP, OMA DS or OMA NMS protocols.

What is also proposed is a synchronization server comprising a communication module able to exchange synchronization messages with a first terminal, called source terminal, and at least one second terminal, called associated terminal, sharing one and the same identifier with the source terminal, and a processing module configured so as to extract a message intended for a third terminal, called recipient terminal, from a first synchronization message received by the communication module and to insert said message into a second synchronization message to be transmitted to said at least one associated terminal.

In one particular embodiment, the processing module is furthermore configured so as to transmit the extracted message to a network node responsible for storing and retransmitting messages, so that said network node is able to retransmit said message to the recipient terminal.

What is moreover proposed is a terminal comprising a communication module and a processing module, the processing module being configured so as to insert a message intended for another terminal, called recipient terminal, into a synchronization message, and the communication module being configured so as to transmit said synchronization message to a synchronization server, so that at least one other terminal, called associated terminal, is able to retrieve the message intended for the recipient terminal from said synchronization server.

In one particular embodiment, the processing module is furthermore configured so as to instruct the communication module to transmit the message to a routing gateway, allowing it to be retransmitted to the recipient terminal in the signaling plane.

What is also proposed is a system for transmitting a message intended for a first terminal, called recipient terminal, from a second terminal, called source terminal, to at least one third terminal, called associated terminal, sharing one and the same identifier with the source terminal, comprising a synchronization server as described above and said at least one associated terminal, configured so as to retrieve the message from the synchronization server by way of a synchronization message. In one embodiment, this system furthermore comprises a source terminal, this source terminal being a terminal as presented above.

BRIEF DESCRIPTION OF THE DRAWINGS

Other features and advantages of the invention will become more clearly apparent upon reading the following description of particular embodiments, provided by way of simple illustrative and nonlimiting examples, and the appended drawings, in which.

and

DETAILED DESCRIPTION OF ILLUSTRATIVE EMBODIMENTS

Figure 1:
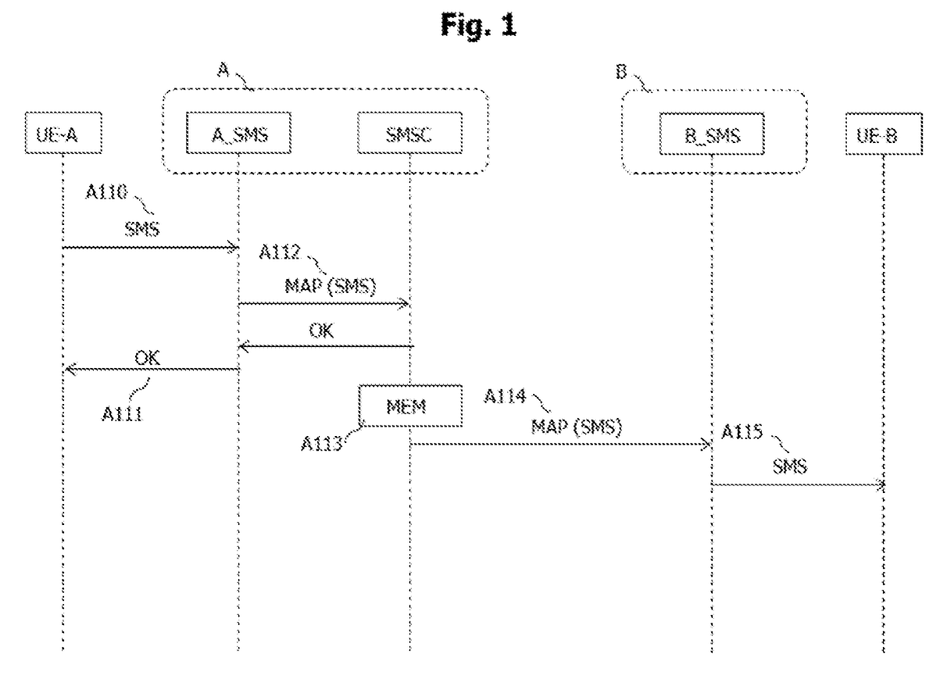
FIG. 1 schematically shows the architecture provided for the transmission of SMS messages, as currently standardized.

Reference is made first of all to FIG. 1, which schematically illustrates the architecture currently provided in the existing 3GPP standards for allowing the transmission of SMS messages from a transmitter mobile terminal UE-A to a recipient mobile terminal UE-B.

In particular, the mobile terminal UE-A formats the message to be transmitted, typically a series of alphanumeric characters entered by the user of this mobile terminal by way of the user interface of this terminal, in accordance with the SMS format.

To format this message, the mobile terminal UE-A is provided with a message formatting module, also called "client messaging", such a module being native, that is to say integrated into the mobile terminal UE-A when it is constructed.

Once this message has been formatted, the mobile terminal UE-A transmits (step A110) this SMS message to a routing gateway A_SMS, belonging to the network A to which the terminal UE-A is subscribed or attached, as the case may be, this gateway being specially dedicated to retransmitting this type of message in the network, by way of a network protocol provided for such transmission between terminals and this routing gateway A_SMS. This network protocol is typically a signaling protocol, that is to say a protocol relating to the transmission of signaling messages in the signaling plane.

In the case of a 2G or 3G access network, this routing gateway A_SMS is implemented in the form of an MSC (for "Mobile Switching Center") server to which the terminal UE-A directly sends the SMS message, while in the case of a 4G access network, this routing gateway A_SMS is implemented in the form of an IP-SM-GW gateway, the message SMS1 then being encapsulated in a message in accordance with the SIP (for "Session Initiation Protocol") signaling protocol that is transmitted to intermediate network nodes ("P-CSCF" or "S-CSCF" nodes for example, not illustrated here), which retransmit it to this IP-SM-GW gateway.

This routing gateway A_SMS then retransmits this SMS message in accordance with a MAP (for "Mobile Application Part") or Diameter signaling protocol to an SMSC (for "Short Message Service Center") network node (sub-step A112), so that this SMSC network node stores (sub-step A113) this SMS message with a view to subsequently retransmitting it to the network B to which the recipient terminal is attached. An acknowledgement of correct reception may then also be transmitted from the SMSC node to the terminal UE-A at this stage (step A111).

At this stage, the SMSC immediately attempts to transmit (sub-step A114) the SMS message to a routing gateway B_SMS of this network B, by way of the MAP signaling protocol. In the case of a 2G or 3G access network, this routing gateway B_SMS is implemented in the form of an MSC (for "Mobile Switching Center") network node, while in the case of a 4G access network, this routing gateway B_SMS is implemented in the form of an IP-SM-GW gateway.

Once the signaling message in accordance with the MAP protocol encapsulating the SMS message has been received by the gateway B_SMS, the latter extracts the SMS from this signaling message and transmits it (step A115) to the terminal UE-B using a NAS ("Non Access Stratum") protocol. In the case of a 4G access network, the gateway B_SMS transmits the message SMS1 to the terminal UE-B by encapsulating it in a message in accordance with the SIP protocol.

Thus, in this architecture, the other terminals that might be associated with the terminal UE-A within a "multi-terminal" system are not able to be informed of the sending, by the terminal UE-A, of an SMS message to the terminal UE-B.

Figure 2:
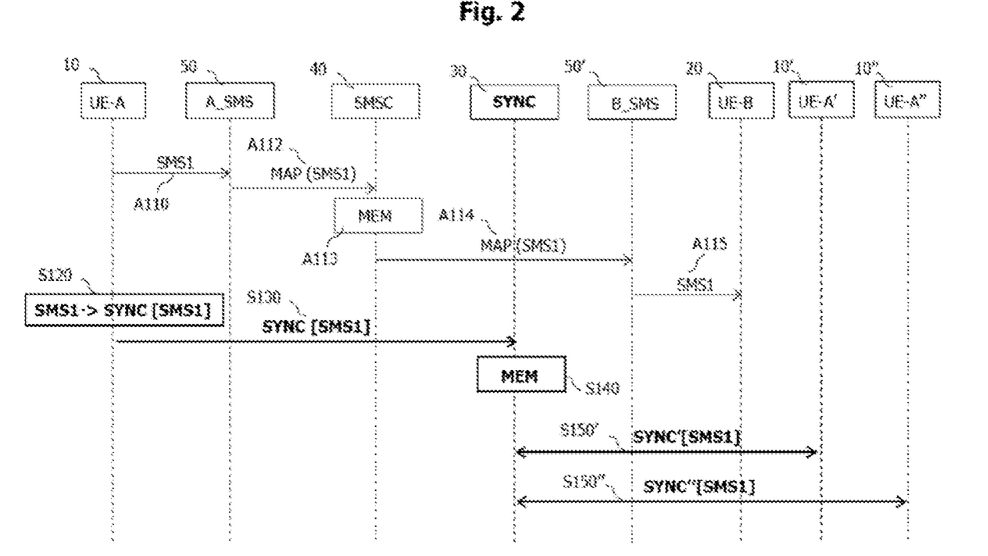
FIG. 2 shows one embodiment of the message transmission method according to the present invention.

Reference is now made to FIG. 2, which illustrates a message transmission method according to a first embodiment of the present invention.

In this first embodiment, a first terminal 10, called source terminal hereinafter, wishes to transmit a message to a second terminal 20, called recipient terminal hereinafter. The terminals 10 and 20 may in particular be mobile terminals, for example smartphones.

The message in question is illustrated here as being a message SMS1, formatted in accordance with the SMS format, without the invention being limited to this single message format, this being able to be applied to any type of message to be transmitted between terminals.

In the present case, the terminal 10 is associated with at least one other terminal, called associated terminal, within the framework of a communication context called "multi-terminal context". In this case too, this may be a mobile terminal, for example a smartphone.

In such a multi-terminal context, the various associated terminals share one and the same identifier, also called common identifier, which may typically be one and the same telephone number (i.e. the same MSISDN identifier of one of the associated terminals), or also be a number not linked natively to one of the terminals of the system, such as an "extra number" or "virtual number" discussed above, which is typically a new number assigned by the operator, not linked to a SIM card or to a particular terminal, such that the other terminals called by (or receiving a message from) one of the associated terminals see only one and the same identifier, regardless of the associated terminal that is actually used.

In this case, FIG. 2 illustrates the case of a multi-terminal system with three associated terminals, in which two other associated terminals 10' and 10" are associated with the source terminal 10, and therefore share one and the same identifier "MSISDN$_{10}$" therewith (in this case the identifier of the source terminal 10), without the invention being limited to this single case, a number N (where N≥1) of terminals being able to be associated with the recipient terminal 10 within such a system.

The associated terminals within a multi-terminal system may in particular be mobile terminals (smartphones, connected watches, tablets, inter alia), but also other less mobile types of terminal, such as voice assistants, or connected refrigerators, that is to say any terminal connected to the network and capable of sending and receiving messages, possibly by displaying them or by vocalizing them.

In addition to the source terminal and the terminals associated with this source terminal, this embodiment involves a synchronization server 30 with which the source mobile terminal 10 and the associated terminals 10' and 10" exchange synchronization messages, denoted "SYNC" here.

In this regard, client synchronization modules are installed in the associated terminals 10, 10' and 10", while a synchronization server module is installed in the synchronization server, these modules being synchronized such that the client modules are notified of changes in the content of the server module of the synchronization server, either in real time as soon as such a change takes place, or in non-real time when one of the client modules interrogates the server module in order to ascertain any changes that have taken place since the last connection of the client terminal to the server.

Such synchronization messages SYNC conform to a synchronization protocol able to be used between a client module and a server module, which may be the IMAP (for "Interactive Message Access Protocol"), JMAP (for the Java implementation of the IMAP protocol), OMA DS (Data Sync) or OMA NMS (Network Message Storage) protocol, for example. In other words, the terminals 10, 10' and 10" synchronize with the synchronization server by exchanging synchronization messages conforming to a synchronization protocol such as one of the abovementioned protocols, cited by way of exemplary synchronization protocol.

In a step (not illustrated) prior to the present method, the terminals 10' and 10" associated with the source terminal 10 register with the synchronization server 30, in order to subsequently benefit from the synchronization service managed by this server. In particular, the synchronization server 30 has access to information making it possible to create the link between all of the associated terminals, typically an identifier common to all of these terminals, such as an identifier MSISDN$_{10}$ of the source terminal 10, or else an extra number, i.e. a new number, supplied by the operator and not linked to a particular terminal or SIM card.

When a message SMS1 (here a message in accordance with the SMS format) is to be transmitted from the source terminal 10 to a recipient terminal 20, the terminal 10 firstly transmits the message SMS1 to the terminal 20 in the manner illustrated above in FIG. 1, using steps A110 to A115 described above in relation to this FIG. 1.

However, in addition to these steps of transmitting the message directly to the terminal 20 in the signaling plane, in the present embodiment, the terminal 10 inserts (step S120) this message SMS1 into a synchronization message SYNC conforming to the synchronization protocol used by the synchronization server 30.

In particular, this message may be inserted into a field of the synchronization message that allows such insertion. By way of example, this message SYNC may be an HTTP POST request with a Mime Text/plain structure into which the message SMS1 is inserted, as illustrated below:

POST /exampleAPI/nms/v1/myStore/tel%3A%2B19585550100/objects
Accept: application/xml
Authorization: BEARER 08776724-6d0d-4aa6-a404-2bc19b5cf903
Host: example.com
Content-Type: text/plain
Content-Length: 40
Hi John, what about a cine this evening?

In response to this request, the server 30 may transmit a unique identifier, assigned by the server 30 to the message SMS1 and inserted into an XML or JSON structure for example, to the terminal 10.

Once the message SMS1 to be transmitted has been inserted into the synchronization message, the resulting synchronization message SYNC[SMS1] is transmitted by the source terminal 10 to the synchronization server 30 (step S130) in the data transport plane.

It should be noted here that step A110 of transmitting the message SMS1 directly to the terminal 20, on the one hand, and steps S120 and S130 of inserting and sending the synchronization message containing the message SMS1 to the synchronization server 30, on the other hand, may be performed in parallel, that is to say simultaneously or in any order with respect to one another.

Once this synchronization message SYNC[SMS1] has been received by the synchronization server 30, the message SMS1 that it contains may be extracted and stored by this synchronization server 30 (step S140), either within a memory of this server or in a database associated with this server.

At this stage, the associated terminals 10' and 10" respectively retrieve the message SMS1 intended for the recipient terminal 10 by way of synchronization messages that they respectively exchange with the synchronization server 30. Thus, with regard to the associated terminal 10', the synchronization server 30 retrieves the message SMS1 intended for the recipient terminal 20 by way of a synchronization message SYNC'[SMS1] that it transmits to this terminal 10 (step S150'). It does the same for all of the other associated terminals, in this case here for the terminal 10" (step S150") to which it sends a synchronization message SYNC'[SMS1] into which it has inserted the message SMS1.

The synchronization messages (here SYNC'[SMS1] and SYNC'[SMS1]) are generated in separate procedures that may however use the same synchronization mechanisms and protocols. As an alternative, these synchronization messages may use different synchronization protocols. The synchronization messages SYNC'[SMS1] or SYNC'[SMS1] used to transmit the message SMS1 to one of the associated terminals 10' or 10" may furthermore be generated using the same synchronization mechanisms and protocols as the synchronization message SYNC[SMS1] used to transmit the message SMS1 from the source terminal 10, or even be a synchronization message of a different type.

These synchronization messages may be implemented in the form of a message containing an attribute into which the message SMS1 is inserted. This may in particular be a "pager-message" message according to the REST NMS interface, containing what is called an "inline" SMS object, in which the message SMS1 may be inserted directly into a "textContent" attribute, as illustrated by the example below:

```
<object>
   <attributes>
      <attribute>
         <name>Message-Context</name>
         <value>pager-message</value>
      </attribute>
      <attribute>
         <name>From</name>
         <value>tel:+19585550100</value>
      </attribute>
      <attribute>
         <name>To</name>
         <value>tel:+19585550210</value>
      </attribute>
      <attribute>
         <name>Date</name>
         <value>2013-11-12T08:30:10Z</value>
      </attribute>
      <attribute>
         <name>Direction</name>
         <value>In</value>
      </attribute>
      <attribute>
         <name>Content-Type</name>
         <value>text/plain</value>
      </attribute>
      <attribute>
         <name>TextContent</name>
         <value>The weather is nice today, let's go to the beach!</value>
      </attribute>
   </attributes>
   <flags>
      <flag>\Seen</flag>
   </flags>
</object>
```

These synchronization messages may also be implemented in the form of a message with a "payload" field containing an address allowing the message SMS1 to be subsequently downloaded (through a GET request for example). In particular, this may be a "pager-message" message according to the NMS REST interface, as illustrated by the example below:

```
<object>
   <attributes>
      <attribute>
         <name>Message-Context</name>
         <value>pager-message</value>
      </attribute>
      <attribute>
         <name>From</name>
         value>tel:+19585550100</value>
      </attribute>
      <attribute>
         <name>Date</name>
         <value>tel:+19585550210</value>
      </attribute>
      <attribute>
         <name>Date</name>
         <value>2013-11-12T08:30:10Z</value>
      </attribute>
      <attribute>
         <name>Direction</name>
         <value>In</value>
      </attribute>
      <attribute>
         <name>Content-Type</name>
```

```
      <value>text/plain</value>
    </attribute>
  </attributes>
  <flags>
    <flag>\Seen</flag>
  </flag>
  <payloadPart>
    <contentType>text/plain</contentType>
    <size>49</size>
    <href>/nms/v1/myStore/tel%3A%2B19585550100/objects/oId999/payloadParts/blob123</href>
  </payloadPart>
</object>
```

These synchronization messages may also be implemented in the form of a notification from the synchronization server, containing, in its subject, a URL that makes it possible to directly download a "message SMS1" object, as illustrated by the example below, in which the element "oId1000" at the end of the URL represents a unique identifier of this message:

```
<nmsEvent>
  <newObject>
    <parentFolder>http://exampleAPI/nms/v1/myStore/tel%3A%2B195855S0100/folders/fId80</parentFolder>
    <resourceURL>http://exampleAPI/nms/v1/myStore/tel%3A%2B19585550100/objects/oId1000</resourceURL>
    <lastModSeq>134</lastModSeq>
    <correlationId>cId67</correlationId>
  </newObject>
</nmsEvent>
```

The previous three examples are in the XML format, but a JSON structure may also be used.

Each associated terminal, after having received such a synchronization message, may then retrieve the message SMS1 intended for the recipient terminal 20, either by extracting it from the synchronization message when it is inserted therein or by downloading this message SMS1 from an address indicated in this synchronization message. The associated terminals 10' and 10" may then store this message SMS1 in their own memories, for subsequent consultation or rendering by a user.

Thus, at the end of this method, all of the terminals associated with the source terminal have access to the message SMS1 transmitted by the source terminal, as well as to information associated with this message, such as the time the message was sent, where the message was sent from, the read or response status of the message, etc. The user of a multi-terminal system therefore has access to one and the same message sending history, regardless of the terminal via which he accesses it.

In one embodiment, the method illustrated in FIG. 2 may be triggered for all messages using, as original identifier, a common identifier potentially used on other terminals, entered by a user on the source terminal 10. To this end, the source terminal 10 may comprise a synchronization message formatting module, configured so as to receive, at input, all of the messages to be transmitted using an identifier common to multiple terminals, and to insert them into synchronization messages to be transmitted to the synchronization server 30.

In the present embodiment, this synchronization message formatting module operates in parallel with the native module for formatting messages to be transmitted, so as to transmit, in parallel, both the message intended for the recipient terminal in accordance with a conventional scheme (steps A110 to A115) and a synchronization message containing this message to the synchronization server 30 (step S130).

In such a "hybrid" embodiment, the message is still transmitted to the recipient terminal by way of signaling messages, therefore in the signaling plane, while copies of this message are transmitted to the terminals associated with the source terminal, in the data transport plane. This makes it possible to guarantee a certain speed of transmission to the recipient terminal, while at the same time saving on resources of the signaling plane as regards copies transmitted to the associated terminals, for which the transmission time is less critical than for the recipient terminal.

In another embodiment, this synchronization message formatting module is placed at the output of the native module for formatting messages to be transmitted, so as to intercept the messages at the output thereof. In this case, a message intended for the recipient terminal 20 is not transmitted as it is, in accordance with the conventional scheme (i.e. to a routing gateway of the network). On the contrary, only a synchronization message containing this message is transmitted to the synchronization server 30.

Figure 3:
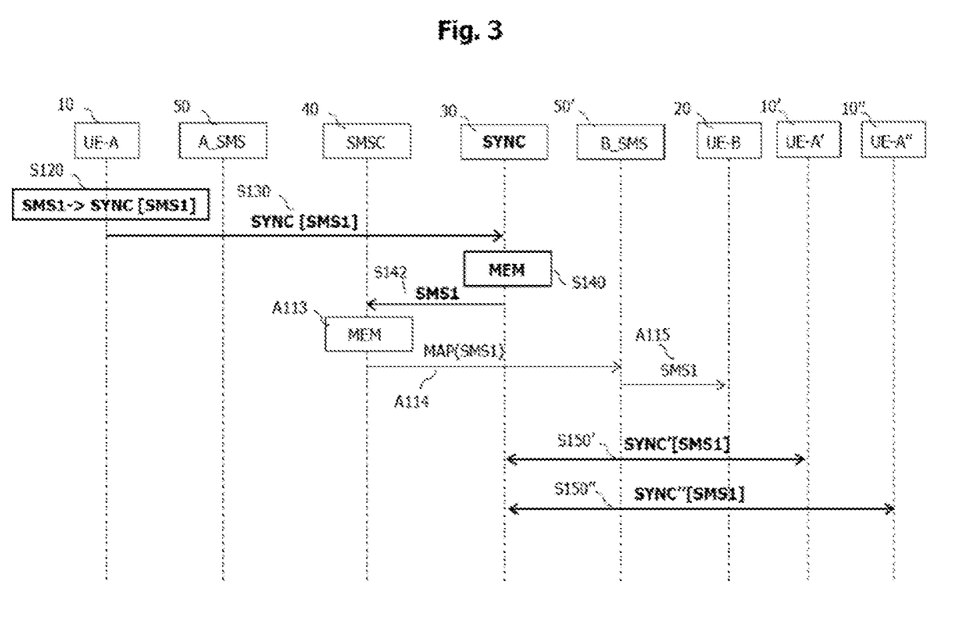
FIG. 3 shows another embodiment of the message transmission method according to the present invention.

Reference is now made to FIG. 3, which illustrates a message transmission method according to a second embodiment of the present invention.

This other embodiment differs from the previous one in that the direct transmission of the message SMS1, from the terminal 10 to the terminal 20 in just the signaling plane, is barred, the message SMS1 then being transmitted by way of a synchronization message, at least partially in the data transport plane, in the same way as for the terminals associated with the terminal 10.

In other words, in the present embodiment, when a message SMS1 (here again a message in accordance with the SMS format) is to be transmitted from the source terminal 10 to a recipient terminal 20, the terminal 10 does not transmit this message SMS1 to the terminal 20 in the manner illustrated above in FIG. 1, and therefore does not use steps A110 to A115 described above in relation to this FIG. 1. This traditional transmission is in this case barred at the terminal 10.

On the contrary, the method according to the present embodiment begins with step S120 of inserting the message SMS1 into a synchronization message SYNC[SMS1], followed by step S130 of transmitting this synchronization message to the synchronization server 30 and step S140 of the synchronization server 30 storing this message SMS1, possibly after it has been extracted from the synchronization message, as described above in relation to FIG. 2.

At this stage, the associated terminals 10' and 10" may retrieve the message SMS1 intended for the recipient terminal 20, by way of synchronization messages that they respectively exchange with the synchronization server 30, in respective steps S150' and S150" as described above in relation to FIG. 2.

However, in the present embodiment, the synchronization server 30 may also at this stage transmit the message SMS1, which it has extracted from the synchronization message SYNC[SMS1] received from the terminal 10, to the network node 40 responsible for storing and retransmitting the messages between mobile terminals, in this case the SMSC center in the case of SMS messages (step S142), for example by way of the MAP signaling protocol used for example by IP-SM-GW gateways to transmit SMS messages to such a network node 40. Any other IP synchronization protocol, or even an API, may be used as an alternative.

This allows the network node 40 to temporarily store this message SMS1 (step A113) before retransmitting it (step A114) to a routing gateway B_SMS for routing such messages (an IP-SM-GW gateway in the case of a 4G access network or an MSC server in the case of a 2G or 3G access network), located in the network B to which the recipient terminal 20 is subscribed/attached, so that said gateway retransmits (step A115) the message to the recipient terminal 20. These steps A113 to A115 are similar to those already described in relation to FIGS. 1 and 2.

It should be noted here that steps S142, A113, A114 and A115, on the one hand, for transmitting the message SMS1 from the synchronization server to the terminal 20, and steps S140, S150' and S150", allowing the terminals associated with the source terminal to retrieve this message SMS1, may be performed in parallel, that is to say simultaneously or in any order with respect to one another.

Thus, at the end of this method, all of the terminals associated with the source terminal have access to the message SMS1 transmitted by the source terminal, as well as to information associated with this message, such as the time the message was sent, where the message was sent from, etc. The user of a multi-terminal system therefore has access to one and the same message sending history, regardless of the terminal he accesses.

Similarly to the previous embodiment, to implement this method, the source terminal 10 may comprise a synchronization message formatting module, configured so as to receive, at input, all of the messages to be transmitted using an identifier potentially common to multiple terminals, and to insert them into synchronization messages to be transmitted to the synchronization server 30.

However, in the present embodiment, this synchronization message formatting module may be placed at the output of the native module for formatting messages to be transmitted, so as to intercept the messages at the output thereof. In this case, a message intended for the recipient terminal 20 is not transmitted as it is, in accordance with the conventional scheme (i.e. to a routing gateway of the network). On the contrary, only a synchronization message containing this message is transmitted to the synchronization server 30 in step S130. As an alternative, in the case of a native module for formatting messages to be transmitted that would be placed in parallel with the synchronization message formatting module, and could therefore possibly transmit the message SMS1 directly in the signaling plane, it is necessary here to instruct this native module for formatting messages to be transmitted to bar such direct transmission, which would be redundant with that performed by the synchronization server in steps S142 to S148.

In this other embodiment, the messages to be transmitted are therefore transmitted almost entirely in the data transport plane, this having the advantage of saving even further on the resources of the signaling plane of the network, such that they are able to be allocated to other services. The use of just the data transport plane to transmit such messages from or to the terminals may turn out to be slower than the use of the signaling plane, but this inconvenience may prove to be minor compared to the gain that is obtained in terms of saving on resources of the signaling plane, especially when considering that there is not actually any need to transmit such messages in real time and that a slight latency time is then tolerable.

The source terminal 10 and the synchronization server 30 may be configured so as to implement only the first or the second embodiment.

Thus, with regard to the first embodiment illustrated in FIG. 2, the terminal 10 may be natively configured (or configured through a software update) so as to synchronize with the synchronization server (step S120) in addition to transmitting the message SMS1 to the routing gateway 50 (step A110). The synchronization server 30 may be configured so as to synchronize with the associated terminals (steps S150' and S150"), without sending a signaling message including the message SMS1 to the network node 40.

With regard to the second embodiment illustrated in FIG. 3, the terminal 10 may be natively configured (or configured through a software update) so as to synchronize with the synchronization server (step S120) without however transmitting the message SMS1 to the routing gateway 50. In other words, its traditional function of sending the message directly in the signaling plane may be deactivated. The synchronization server 30 may then be configured, in addition to synchronizing with the associated terminals (steps S150' and S150"), so as also to send a signaling message including the message SMS1 to the network node 40 (S142), in order to allow this message to reach the recipient terminal 20.

The synchronization server 30 may be configured so as to synchronize with the associated terminals (steps S150' and S150"), without sending a message including the message SMS1 to the network node 40.

In another embodiment, however, both the terminal 10 and the synchronization server 30 may implement the first or the second embodiment of the method described above.

The terminal 10 is then natively configured (or configured through a software update) so as to synchronize with the synchronization server (step S120) and, in addition, to be able to activate or deactivate the transmission of the message SMS1 to the routing gateway 50 in the signaling plane (step A110).

This activation or deactivation may be instructed by the user of the terminal, by way of a command entered via the user interface or a configuration menu of the terminal 10, or else remotely by a command message transmitted from the communication network, for example by the operator of this network. Thus, when the message SMS1 is transmitted by a communication module of the terminal 10, this module may be configured so as to receive such a command to activate or to deactivate this type of transmission (step A110) and activate or deactivate this transmission on the basis of this command.

The synchronization server 30 is then, for its part, configured so as to synchronize with the associated terminals (steps S150' and S150") and, furthermore, to be able to activate or deactivate the transmission of a signaling message, including the message SMS1, to the network node 40 (step S142).

This activation or deactivation may be instructed by an operator of the server, by way of a command entered via a user interface or a configuration menu of this server 30, or else remotely by a command message transmitted from the communication network, for example by the operator of this network.

However, since it is preferable for this activation or deactivation on the server 30 side to take into account the activation or deactivation on the terminal 10 side, the method may advantageously comprise a step (not illustrated) of the synchronization server 30 determining the transmission (step A110) of the message SMS1 from the source terminal 10 to a routing gateway 50. The transmission (step S142) of the message SMS1 from the synchronization server 30 to the network node 50 then takes place only if the result of this determination is positive.

This determination may be performed by way of detecting an activation or deactivation indicator for step A110, inserted into the synchronization message SYNC[SMS1] that the terminal 10 transmits to the server 30.

In other words, when the transmission (step A110) of the message SMS1 is activated on the terminal 10 side, the terminal 10 inserts an indicator signaling this activation into the message SYNC[SMS1] sent to the server 30. When this server 30 receives this message SYNC[SMS1] and detects this indicator therein, it then deactivates the transmission (step S142) of the message SMS1 to the network node 40, which would be redundant. Conversely, when the transmission (step A110) of the message SMS1 is deactivated on the terminal 10 side, the terminal 10 inserts an indicator signaling this deactivation into the message SYNC[SMS1] sent to the server 30. When this server 30 receives this message SYNC[SMS1] and detects this indicator therein, it then activates the transmission (step S142) of the message SMS1 to the network node 40, in order to trigger the retransmission of this message SMS1 to the terminal 20.

Figure 4:
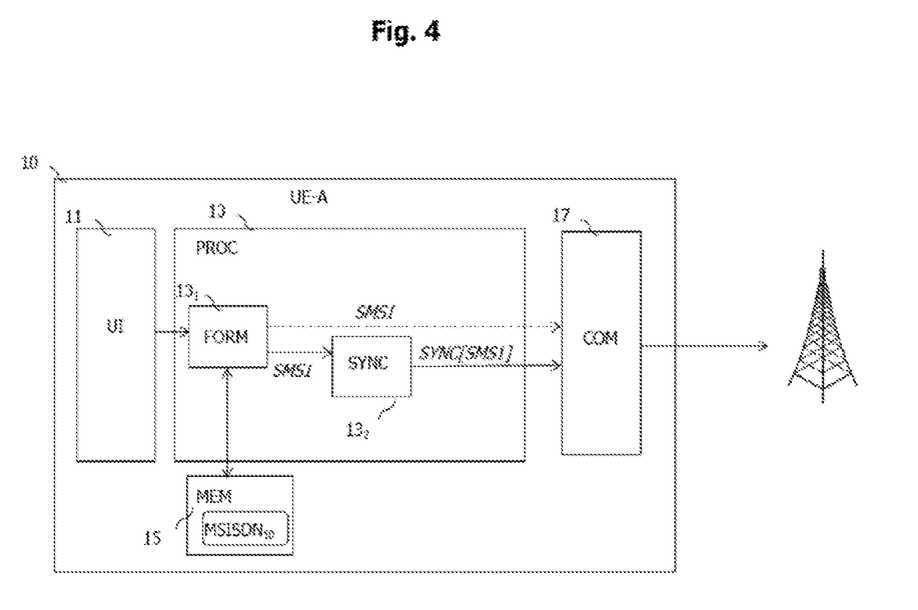
FIG. 4 illustrates a terminal according to one embodiment of the present invention.

Reference is now made to FIG. 4, illustrating a terminal according to one embodiment of the present invention.

The terminal 10 (which may be a mobile terminal, such as for example a smartphone) comprises in particular a user interface module 11, allowing a user to enter a message, called "raw message", to be transmitted to a recipient mobile terminal, this user interface module being able to take the form of a keypad or of a touchscreen for entering alphanumeric characters, or even of a voice recognition interface allowing such entry.

The terminal 10 also comprises a processing module 13 configured so as to receive, at input, the raw message entered by a user and to format it in the form of a message able to be transmitted on the communication network to which the terminal is attached. To this end, the processing module 13 comprises a native module 131 for formatting messages to be transmitted, configured so as to encapsulate the raw message entered by the user in a formatted message allowing it to be transmitted on the network, typically an SMS formatting module that delivers, at output, SMS messages to be transmitted to the network. As discussed above, this native module 131 may be configured so as to receive an instruction to bar direct transmission of messages to the network, in particular when it is desired to implement the method as illustrated in FIG. 3. Such a processing module is typically implemented in the form of one or more processors executing code instructions of a computer program, associated with a random-access memory and/or a read-only memory in which these code instructions are stored.

The terminal 10 furthermore comprises a storage module 15 storing, inter alia, an identifier of the terminal 10, typically but not exclusively a telephone number assigned to the terminal, here $MSISDN_{10}$. This storage module 15 may also store an identifier common to the multi-terminal system to which the terminal 10 belongs, or a virtual identifier, which may then be used to indicate that the messages transmitted by this terminal should be broadcast to terminals associated with this terminal in such a system.

This storage module may be implemented in the form of a removable SIM card, or even an eSIM card integrated into the terminal 10. The native module 131 accesses this module 15 so as to extract the identifier $MSISDN_{10}$ therefrom in order either to insert it, as it is, as a common identifier, into the formatted message that it prepares or to use it in a request to retrieve the common identifier from a remote HLR server during attachment to the network, before inserting this retrieved identifier into the formatted message that it prepares, so that this message is able to identify its transmitter.

In the context of the present invention, the processing module 13 furthermore comprises a synchronization message formatting module 132 receiving, at input, the message delivered by the native module 131 and inserting it into a synchronization message intended to be transmitted to a synchronization server with which the terminal 10 is registered.

The terminal 10 lastly comprises a communication module 17, able to receive the messages prepared by the processing module 13 in order to transmit them, by radio, to the communication network to which the terminal 10 is attached. Such a communication module may be implemented in particular in the form of one or more radio antenna(s) connected to a digital-to-analog converter receiving, at input, the messages prepared by the processing module 13, in particular the synchronization messages delivered by the module 132. As indicated above, this communication module 17 may, in addition to the synchronization messages SYNC encapsulating messages intended for a recipient terminal, also receive messages prepared by the native module 131, in order to transmit them in parallel with the synchronization messages containing these messages.

Figure 5:
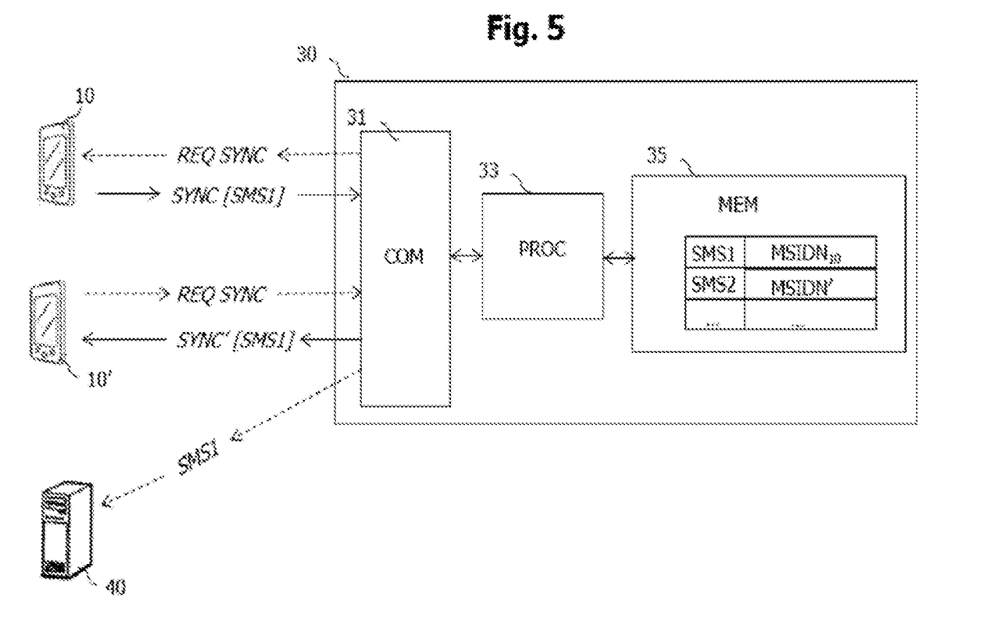
FIG. 5 illustrates a synchronization server according to one embodiment of the present invention.

Reference is now made to FIG. 5, illustrating a synchronization server according to one embodiment of the present invention.

This synchronization server 30 comprises in particular a communication module 31 (typically implemented in the form of a transceiver) configured so as to exchange synchronization messages SYNC with the source terminal 10, as well as synchronization messages SYNC' with the one or more terminals 10', 10" associated therewith (a single associated terminal 10' being illustrated here).

The synchronization server 30 furthermore comprises a processing module 33, configured firstly so as to process the synchronization messages SYNC received from the source terminal 10, and in particular to extract therefrom a message intended for a recipient terminal 20, for example an SMS message, when such a message has been inserted therein (this case being illustrated here in FIG. 5 by the message SYNC[SMS1]). Such a processing module is typically implemented in the form of one or more processors executing code instructions of a computer program, associated with a random-access memory and/or a read-only memory in which these code instructions are stored.

This message SMS1, once it has been extracted from the synchronization message SYNC[SMS1], may then be stored in a storage module 35 (typically implemented in the form of a non-volatile memory), which is illustrated here as being contained in the synchronization server 30, but which may also be implemented in the form of a database separate from this server, and to which this server has access in order to store these messages and subsequently access them.

This message may be stored, in the storage module 35, in association with an identifier of the source terminal 10 (here its identifier "$MSISDN_{10}$") in order to facilitate its subsequent retrieval.

When subsequently a terminal associated with the source terminal 10 has to be synchronized, the processing module 33 may then verify, with the storage module 35, whether a message SMS1 associated with the unique identifier that is associated therewith has been stored and, if this is the case, the module 33 may then retrieve this message in order to insert it into a synchronization message SYNC'[SMS1] that it delivers to the communication module 31 so that the latter transmits the synchronization message SYNC'[SMS1] to the associated terminal in question.

The messages SYNC[SMS1] and SYNC'[SMS1] may be transmitted spontaneously (that is to say without a prior request having been received to trigger the transmission of this message) by the source terminal 10 and the synchronization server 30, respectively, for example at regular intervals, in a "push" mode. As an alternative, these messages may be messages transmitted in response to synchronization requests received from the synchronization server 30 and from the source terminal 10, respectively, in what is called a "pull" mode (such requests being illustrated by "REQ SYNC" in FIG. 4).

Of course, the invention is not limited to the exemplary embodiments described and shown above and on the basis of which it is possible to provide other embodiments and forms of implementation without otherwise departing from the scope of the invention.

In particular, SMS messages were discussed above by way of example of short messages that may advantageously be transmitted by virtue of the embodiments of the present invention. However, any other type of more or less short message may also be involved, the invention however being particularly advantageous when the size of the message to be transmitted is smaller than the size of the field available to insert it into a synchronization message between a terminal and a synchronization server, such that a single synchronization message is sufficient to transmit one (or even multiple) message(s), intended for a "recipient" terminal, to another terminal associated with this recipient terminal.

In addition, the synchronization server presented above may be a specific equipment, dedicated solely to the synchronization of messages with terminals associated with a terminal that is a recipient of messages, but also any network equipment having other functionalities and in which a "server" software module is installed with a view to exchanging the synchronization messages SYNC presented above with a "client" software module installed in terminals associated with the recipient terminal.

Although the present disclosure has been described with reference to one or more examples, workers skilled in the art will recognize that changes may be made in form and detail without departing from the scope of the disclosure and/or the appended claims.

The invention claimed is:

1. A method comprising:
transmitting a message intended for a first terminal, called a recipient terminal, from a second terminal, called source terminal, to at least one third terminal, called an associated terminal, sharing a same identifier with the source terminal, the transmitting comprising:
inserting, by the source terminal, the message intended for the recipient terminal into a first synchronization message conforming to a synchronization protocol,
transmitting, from the source terminal to a synchronization server, the first synchronization message; and
said at least one associated terminal retrieving the message intended for the recipient terminal from the synchronization server by way of at least one second synchronization message.

2. The method as claimed in claim 1, furthermore comprising transmitting, from the source terminal to a routing gateway, the message intended for the recipient terminal, so that said routing gateway is able to retransmit said message to the recipient terminal in a signaling plane.

3. The method as claimed in claim 1, furthermore comprising transmitting, from the synchronization server to a network node responsible for storing and retransmitting messages, the message intended for the recipient terminal, so that said network node is able to retransmit said message to the recipient terminal.

4. The method as claimed in claim 3, comprising the synchronization server determining transmission of the message from the source terminal to a routing gateway, the transmission of the message from the synchronization server to the network node taking place only if a result of this determination is positive.

5. The method as claimed in claim 4, wherein the determining is performed by way of detecting an activation indicator for the transmission of the message from the source terminal to a routing gateway, inserted into the first synchronization message.

6. The method as claimed in claim 1, furthermore comprising the synchronization server storing the message intended for the recipient terminal, extracted from the first synchronization message, so as to allow said at least one associated terminal to retrieve the message intended for the recipient terminal.

7. The method as claimed in claim 1, wherein the message intended for the recipient terminal is a message in a Short Message Service (SMS) format.

8. The method as claimed in claim 1, wherein the first and/or the second synchronization message is a message conforming to a protocol from among Interactive Message Access Protocol (IMAP), Java implementation of IMAP (JMAP), Open Mobile Alliance Data Sync (OMA DS) or Open Mobile Alliance Network Message Storage (OMA NMS) protocols.

9. A synchronization server comprising:
at least one processor; and
at least one non-transitory computer-readable medium comprising instructions stored thereon which when executed by the at least one processor, configure the synchronization server to:
exchange synchronization messages with a first terminal, called a source terminal, and at least one second terminal, called an associated terminal, sharing a same identifier with the source terminal, the exchange of synchronization messages comprising synchronization server receiving a first synchronization message from the source terminal, and extract a message intended for a third terminal, called a recipient terminal, from the first synchronization message received by the synchronization server from the source terminal and insert said message intended for the third terminal into a second synchronization message to be transmitted to said at least one associated terminal.

10. The synchronization server as claimed in claim 9, wherein the instructions further configure the synchronization server to transmit the extracted message to a network node responsible for storing and retransmitting messages, so that said network node is able to retransmit said message to the recipient terminal.

11. A system comprising:
a synchronization server; and
a source terminal, the source terminal comprising:
at least one processor; and
at least one non-transitory computer-readable medium comprising instructions stored thereon which when executed by the at least one processor, configure the source terminal to:

insert a message intended for another terminal, called a recipient terminal, into a first synchronization message conforming to a synchronization protocol, and transmit said first synchronization message to the synchronization server; and wherein the synchronization server is configured to extract the message intended for the recipient terminal from the first synchronization message and insert the extracted message into a second synchronization message to be transmitted to at least one other terminal, called associated terminal, sharing a same identifier with the source terminal.

12. The system as claimed in claim 11, wherein the instructions further configure the source terminal to transmit the message intended for the recipient terminal to a routing gateway, allowing the message to be retransmitted to the recipient terminal in a signaling plane.

* * * * *